Jan. 28, 1947.  R. W. BROWN  2,415,026
VEHICLE SUSPENSION
Filed July 23, 1943  5 Sheets-Sheet 2

Inventor
ROY W. BROWN

Jan. 28, 1947.  R. W. BROWN  2,415,026
VEHICLE SUSPENSION
Filed July 23, 1943  5 Sheets-Sheet 3

Inventor
ROY W. BROWN

Ely & Frye
Attorneys

Jan. 28, 1947.  R. W. BROWN  2,415,026
VEHICLE SUSPENSION
Filed July 23, 1943  5 Sheets-Sheet 5

Inventor
ROY W. BROWN
By Ely & Frye
Attorneys

Patented Jan. 28, 1947

2,415,026

UNITED STATES PATENT OFFICE 2,415,026

VEHICLE SUSPENSION

Roy W. Brown, Akron, Ohio, assignor to The Firestone Tire & Rubber Company, Akron, Ohio, a corporation of Ohio Application July 23, 1943, Serial No. 495,947

7 Claims. (Cl. 280—44)

This invention relates to a suspension for wheeled land vehicles such as gun carriages and the like of a type in which the carriage is adapted to be towed by some sort of draft vehicle for moving the gun from place to place, and also is to be rendered immobile as when firing. More specifically, the invention relates to a pneumatic suspension which will serve as a cushioning means for the load and also, when it is desired to fire the gun, will become a jack by means of which the carriage may be lowered to the ground taking the load from the wheels and thereafter, may serve to raise the gun and carriage preparatory to moving to another location. By this means leaf or coil springs are eliminated and independent lowering and raising means for the carriage are not required. This invention is an improvement over the constructions of U. S. Patent 2,103,670 and U. S. application Ser. No. 448,472 to R. W. Allen.

For illustrative purposes, the invention is depicted and described herein as it is applied to a mobile artillery unit, for which the invention is of primary utility.

The chief objects of the invention are to provide in a gun mount an improved pneumatic vehicle suspension capable of functioning as a jack to raise or lower the bed or frame of a vehicle; to provide a simple, light-weight, rugged wheel suspension of the character mentioned that enables substantial wheel adjustment so that the vehicle bed may be supported at an adequate elevation for cross-country transportation; to provide a vehicle suspension enabling the vehicle to move at relatively high speed over rough terrain; and that enables mobile artillery equipped with the improved suspension quickly to get into firing position, and quickly to depart from said position, if necessary. Other objects will be manifest as the description proceeds.

Figure 1:
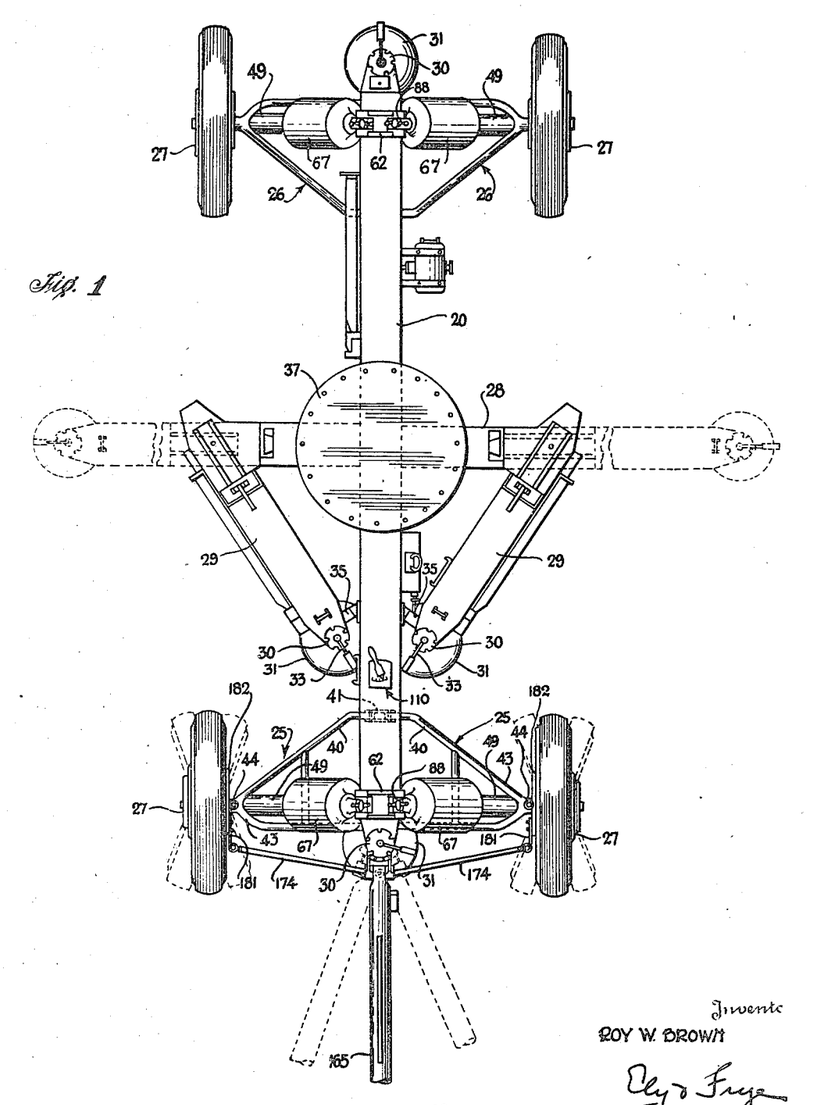
Fig. 1 is a plan view of the bed or frame of the gun carriage shown in Fig. 2, the superstructure and gun being omitted.
Figure 2:
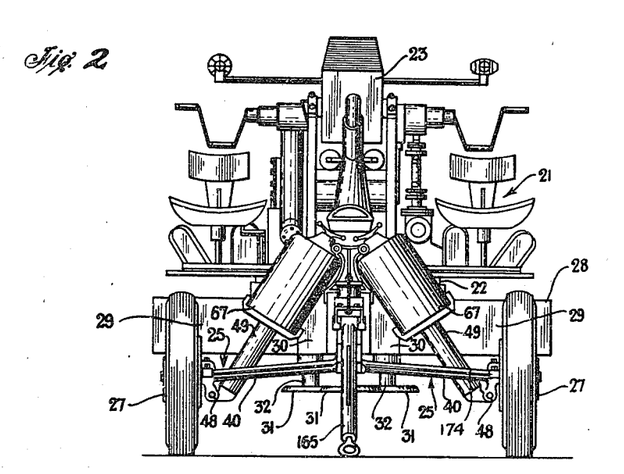
Fig. 2 is a front elevation of a "Bofors" gun carriage in elevated or traveling position, and the improved pneumatic suspension operatively associated therewith.
Figure 3:
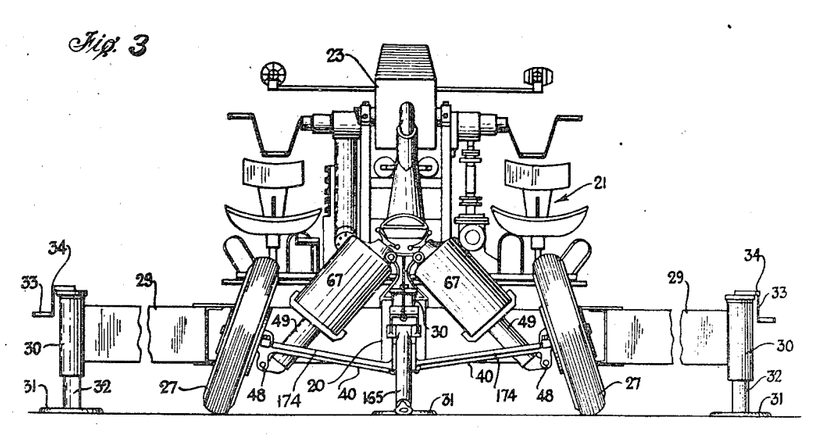
Fig. 3 is a view of the structure shown in Fig. 2, in lowered or firing position.

Referring now to the drawings, especially Figs. 1 through 3 thereof, there is shown a gun carriage that comprises a main frame or bed 20 that extends longitudinally of the vehicle, and a top carriage, designated as a whole by the numeral 21, that is supported by said main frame and movable relatively thereof in a horizontal plane, the top carriage being mounted upon a turntable 22, and provided with a gun 23 that is suitably swivelled for movement in a vertical plane, relatively of the carriage 21. The top carriage 21 and mechanism carried thereby constitute no part of the present invention so that a description thereof in greater detail will not be required.

The bed or frame 20 is tubular and horizontally disposed, and is substantially rectangular in cross section. At the front and rear ends of said main frame are transversely disposed wheel-carrying assemblies generally designated 25 and 26 respectively, which assemblies will be described in detail hereinafter, said assemblies comprising wheels 27 which are provided with any known or preferred pneumatic tires for supporting the vehicle. The frame 20 is provided at a point intermediate the wheel-carrying assemblies with a transversely disposed arm 28 to which is pivoted, at the ends thereof, a pair of identical outriggers 29, 29. The outriggers are arranged to be swung from an inoperative folded-back position as shown in full lines in Figs. 1 and 2 to the extended, operative position shown in full lines in Fig. 3, and in broken lines in Fig. 1. Each outrigger is provided at its outer end with a screw jack 30 having a ground engaging foot plate 31 that is swivel-connected to the lower end of a post 32.

Each post 32 is vertically adjustable by means of a manually operable crank 33, each of the latter being pivoted at 34 to enable folding into the position shown when not in use. Locking means indicated generally at 35, Fig. 1, is provided for retaining the outriggers in the traveling position shown in full lines in said figure. Other screw jacks 30 are mounted at the front and rear ends respectively of the main frame 20. A circular base plate 37 is mounted upon the frame members 26, 28 at the intersection thereof, and it is upon base plate 37 that the turntable 22 is mounted.

The wheel carrying assemblies 25, 26 at the opposite ends of the main frame 20 are of identical construction except for steering mechanism which is associated with the front wheels and which subsequently will be described. Each assembly comprises a forked arm 40 that has its forks pivotally connected to respective brackets, such as the bracket 41, Fig. 4, by means of hinge pins 42. Said brackets 41 are mounted upon the under side of main frame 20, at spaced points longitudinally thereof, the hinge pins 42 of the two brackets being in axial alignment. At the free, outer end of each forked arm 40 the latter is formed with a bearing portion 43 in which is journaled a pin 44 upon which is fixedly mounted an axial spindle 45, and journaled upon said spindle is one of the wheels 27 of the vehicle. Each bracket 41 is of dual construction and carries two hinge pins 42, one for each of the forked arms 40. The arrangement is such that each front wheel 27 may be swung or oscillated relatively of the main frame 20, the hinge pins 42 constituting the axes of oscillation of the wheels. By oscillating the arms 40 the wheels 27 may be tilted from the position shown in Fig. 2 to the position shown in Fig. 3 and vice versa. When the wheels are tilted to the position shown in Fig. 3, the gun carriage is in its lowered, firing position.

For oscillating the forked arms 40 to tilt the wheels 27 as described, suitable fluid pressure operated means is provided, and to this end the bearing portion 43 at the outer end of each arm 40 is formed with a downwardly extending bifurcated ear 47, Fig. 4, that carries a pivot pin 48, the latter being disposed transversely of the pin 44, and located below a line that connects the axis of the axle 45 with the axis of oscillation 42 of the wheel. Pivotally connected to the pivot pin 48 is the lower end of a tubular member 49 that constitutes an element of a fluid pressure operated unit, said lower end of member 49 being closed or sealed.

Figures 4, 5:
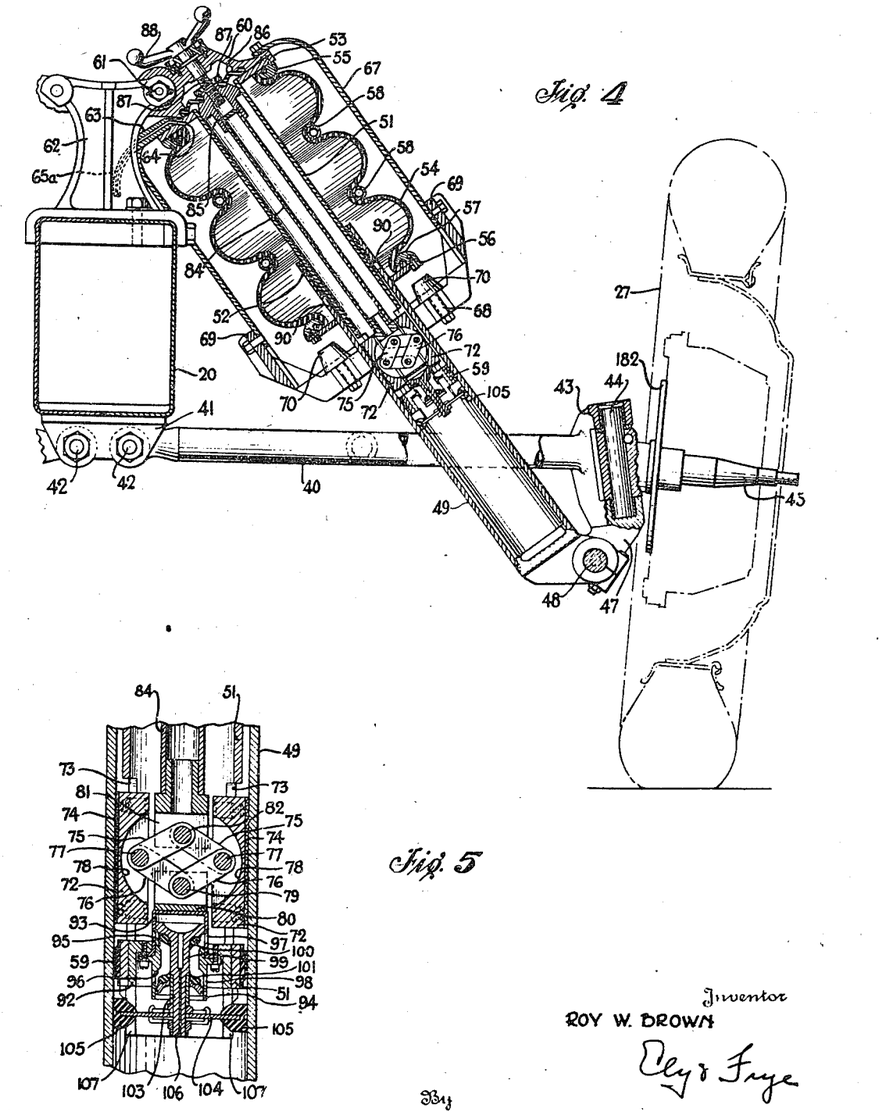
Fig. 4 is a diametric section of one of the pneumatic suspension units of the vehicle, namely, the one at the left front wheel of the vehicle.
Fig. 5 is a detail sectional view, on a larger scale of a portion of the mechanism shown in Fig. 4, especially a braking device.

Said fluid pressure operated unit, shown in detail in Figs. 4 and 5, constitutes a part of the pneumatic suspension system of the vehicle. The lower tubular member 49 thereof is partly telescoped with an upper tubular member 51 of smaller diameter, there being a fluid-tight packing 52 interposed between the upper end portion of the member 49 and the outer surface of member 51, and similar fluid-tight packing 59 on the lower end portion of the member 51 in engagement with the inner surface of member 49. The packings 52, 59 serve to maintain the tubular members 49, 51 in concentric relation with a space or passage between the walls thereof, and also to offer frictional resistance to relative axial movement of the tubular members. Secured to the upper end of upper tubular member 51, preferably by welding, is the annular upper end plate 53 of a bellows 54, the end portion of the bellows being secured to said plate by a clamping ring 55 that is secured thereto by screws. The bellows comprises an annular lower end plate 56 that is secured to the upper end portion of lower tubular member 49, preferably by welding, the lower end of the bellows being secured to end plate 56 by means of a clamping ring 57 that is secured thereto by screws. The bellows 54 comprises a tubular wall of rubber and fabric construction which may be substantially identical with the air spring bellows shown in my prior U. S. Patent No. 2,208,537, issued July 16, 1940. Intermediate its ends the bellows 54 is circumferentially constricted at two spaced apart regions, and in said constricted regions are restrictive externally applied girdle rings 58, 58. The arrangement is such that the bellows constitutes three interconnected chambers, that are deformable in operation, at which time the girdle rings float and oppose expansion of the constricted regions of the bellows.

For supporting the bellows structure at its upper end, a bracket 60 is attached to upper plate 53 thereof, said bracket being pivotally connected at 61 to an upright standard 62 that is bolted to the top side of main frame 20. The standard 62 is of dual construction so as to serve as an upper anchor for two bellows structures as is clearly shown in Fig. 1. Welded to the top of bellows plate 53 is a tubular inlet member 63 that communicates with the interior of the bellows through a port 64 formed in said upper bellows plate. The outer end of member 63 has a metal conduit 65a connected thereto, which conduit extends to a reservoir of fluid under pressure (not shown) or to a compression pump (not shown). The arrangement is such that the admission of air under pressure to the bellows 54 will distend and elongate the same whereby the lower tubular member 49 is projected obliquely downwardly and the wheel 27 is maintained in the substantially upright traveling position shown in Fig. 4.

Positioned about the bellows 54 is a hollow metal guard or shield 67 adapted to protect the bellows from gun fire or other damaging impact. The shield 67 is open at its lower end, the upper end thereof comprising an inturned flange that is bolted to bracket 60 and bellows top plate 53, whereby the shield is supported concentrically of the bellows. Below the shield 67 an annular bumper support 69 encircles the lower tubular member 49, concentrically thereof, said bumper support being formed with a plurality of radially extending arms 69, 69 that are attached to the lower end portion of the shield 67, so as to support said bumper support. The latter has mounted thereon a plurality of resilient bumpers 70, 70 that project upwardly therefrom into the open end of the shield 67 in position to engage the lower bellows plate 56 when the bellows is inflated and fully distended, and thereby to limit expansion of said bellows, and to limit the projected movement of the tubular member 49 carried by the lower end plate 56 of said bellows.

The bellows 54 constitutes resilient means for holding the wheel 27 in traveling position shown and for cushioning shocks imposed upon the wheel when traveling over rough ground. Upon occasion, however, it may be desirable to secure the wheel in fixed determinate position, such an occasion being when the bellows is punctured or otherwise disabled, or upon failure of the pump or other means supplying the bellows with air. To this end mechanical means is provided for preventing movement of the lower tubular member 49 relatively of the upper tubular member 51. Said means comprises a pair of brake shoes 72, 72 that are located within the upper tubular member 51 in the lower region thereof that is in telescoped relation with lower tubular member 49. In the region of the brake shoes, tubular member 51 is slotted or apertured at diametrically opposite regions 73, 73 to enable the respective brake shoes 72 to project therethrough, and the outwardly presented faces of the brake shoes are provided with facings of friction material 74, such as brake lining, so that the brakes may have adequate frictional contact with the inner surface of the lower tubular member 49. For supporting the brake shoes 72 and for moving them radially of the tubular members 49, 51, respective pairs of toggles are provided, each toggle comprising a pair of toggle links 75, 76. The toggle links 75, 76 of each pair are pivotally connected to each other by a pin 77, the connected ends of each pair of links being disposed within a slot 78 in a brake block, the pin 77 also extending through the brake block and serving to connect the same to the toggle. The lower links 76 of the two toggles are pivotally connected to each other by a pin 79 that extends through them and has its ends secured in opposite sides of the upper tubular member 51. The pin 79 constitutes a fixed connection for the toggles, and also is utilized to secure a slotted block 80 in the tubular member 51, the end portions of toggle links 76 being disposed within the slot in said block 80. The toggle links 75 have end portions overlapping each other in a slot in a block 81, and said links are pivotally connected to each other and to said block 81 by a pin 82 extending therethrough. The block 81 is disposed within the tubular member 51, the arrangement being such that movement of the block axially of said tubular member will operate the toggles to project or retract the brake blocks 72. In Fig. 5 the brake blocks are shown in operative engagement with the lower tubular member 49.

For so moving the toggle block 81, said block is secured to the lower end of a tubular stem 84 that extends upwardly in the tubular member 51 and has its upper end secured to a non-rotatable nut 85 that is mounted in the upper end of said tubular member 51 and arranged to move axially of the latter. To prevent the escape of pressure fluid from the upper end of tubular member 51, an annular flexible diaphragm 86 of rubber or similar material has its inner circumference clamped to the nut 85 by clamp member 87, the peripheral region of the diaphragm being clamped between the upper end plate 53 of the bellows and the bracket 60. The use of the diaphragm 86 assures a fluid-tight seal between the nut 85 and tubular member 51 without the use of gaskets, glands, or other complex constructions that produce friction and are subject to leakage. For effecting axial movement of the nut 85, a screw 87 is threaded therethrough, said screw having an unthreaded portion that is journaled in the bracket 60 and secured against longitudinal movement relatively thereof, the upper end of said screw projecting above the said bracket and provided with a handle or knob 88 by which the screw is manually rotated, to effect operation of the brake structure described.

As previously stated, the bellows 54 holds the wheel 27 in traveling position and cushions shocks imposed thereon, and in its latter function it is assisted and supplemented by an arrangement of the tubular members 49, 51 whereby air may be compressed within the lower part of the tubular member 49. To this end said lower tubular member is apertured at 90, 90 in the region thereof that is disposed within the bellows 54, below the packing 52. This enables air from the bellows to pass into the interior of the member 49. Located within the member 49, immediately below the brake shoes 72 previously described, is valve mechanism for automatically shutting off communication between the bellows 54 and the chamber in the lower end portion of member 49, to enable compression of the air within said chamber, said valve being arranged to operate automatically to effect equalization of the pressures in the bellows and said chamber, after the air has been compressed, to obviate reaction which would cause rebound of the vehicle.

As is best shown in Fig. 5, an annular collar or plug 92 is fixedly secured in the lower end portion of the tubular member 51, immediately below the brake-slots 73 therein, the upper end of said collar being formed with an inwardly extending circumferential flange to which is secured an axially disposed upwardly extending bonnet 93 of inverted cup shape, and a downwardly extending axially disposed tubular sleeve 94. The closed, upper end of the bonnet 93 may abut the bottom of block 80 as shown. The upper end portion of sleeve 94 telescopes into the open lower portion of bonnet 93, and is formed interiorly with a circumferential flange or rib that has its upper and lower margins reversely beveled so as to constitute valve seats 95, 96 respectively. Immediately above the valve seat 95 the wall of the bonnet 93 is formed with a plurality of apertures or ports 97, and immediately below the valve seat 96 the sleeve 94 is formed with a plurality of apertures or ports 98. The bonnet 93 and sleeve 94 constitute a housing for a piston type valve structure 99 that is mounted therein and capable of sliding movement axially thereof. Said valve 99 is formed with a reduced medial or waist portion, but is of such size each side thereof as to slidingly engage the walls of the bonnet and sleeve respectively above and below the flange that comprises the valve seats 95, 96. The enlarged upper end portion of the valve structure carries a circumferential facing or valve element 100 of rubber or other suitable resilient material adapted for fluid-tight engagement with the upper valve seat 95 when the valve structure is in lowermost position, thereby closing the ports 97 and preventing flow of fluid from the upper tubular member 51 into the chamber in the lower end of lower tubular member 49. In like manner the lower enlarged portion of the valve structure carries a valve element 101 of resilient material adapted for fluid-tight engagement with the lower valve seat 96 when the valve structure is in uppermost position, thereby closing the ports 98 and preventing flow of fluid from the chamber in tubular member 49 into the tubular member 51. As is most clearly shown in Fig. 5, the valve is open to admit the passage of fluid only when it is in intermediate position, and then only momentarily as presently will be explained.

For moving the valve structure axially to its alternative operative positions, said structure is formed with a downwardly projecting stem 103 upon the lower end of which is mounted a transverse arm 104, the opposite end portions of which carry respective arcuate gaskets 105 that frictionally engage the inner surface of the lower tubular member 49 in local regions thereof. The arrangement is such that neither the arm 104 nor the gaskets 105 prevent the flow of fluid to and from the valve. Friction between the gaskets 105 and tubular member 49 is sufficient to move the valve structure 99 to its alternative position immediately upon reverse relative axial movement between tubular members 49, 51. After the valve is seated on either of the valve seats 95, 96, continued relative movement of said tubular members causes the member 49 to slide relatively of the gaskets and little or no strain is placed on the valve. The valve structure 99 is formed with an axial bore 106 extending from end to end thereof so that operation of the valve will not be affected by the presence or absence of fluid in bonnet 93 between the upper end of the latter and the upper end of the valve structure. The lower end of the upper tubular member 51 extends to a point even with or slightly below the lower end of the valve stem 103, and the lower end portion of said member is slotted as at 107, 107 to enable the arm 104 and gaskets 105 to extend therethrough so that the latter may engage the tubular member 49. The arrangement is such that if, on occasion, the tubular members should move to completely telescoped position, it would be the lower end of member 51 and not valve stem 103 that would "bottom" against the closure at the lower end of member 49.

Assuming that the elements of each pneumatic suspension unit are in the operative positions shown in Fig. 4, and the vehicle is traveling over rough terrain, it will be obvious that the suspension is in dynamic condition and that lower tubular member 49 will reciprocate with relation to fixedly positioned upper tubular member 51 and there will be some compression and expansion of the fluid within the bellows 54. As the tubular member 49 moves upwardly over tubular member 51, it moves valve 99 upwardly so that valve element 101 engages valve seat 96 and thereby closes communication between the chamber in tubular element 49 below the valve, and the bellows above the same. Thus continued upward movement of the lower tubular member effects compression of the fluid within its chamber, thereby offering increasing resistance to such upward movement of said lower tubular member. As soon as the impelling force on the lower tubular member is spent, its direction of movement reverses, with the immediate result that the valve 99 is moved downwardly. Before the valve element 100 engages valve seat 95, there is a brief interval during which both valve elements 100, 101 are unseated, and the chamber in the tubular member 49 is in communication with the bellows through the agency of ports 97, 98, thus enabling the pressures on opposite sides of the valve to equalize. Thus the expansive force of the compressed fluid in the unit largely is overcome, and resulting rebound prevented. The valve acts in a similar manner when the direction of movement of the tubular member 49 reverses after it has moved downwardly with relation to tubular member 51. The pneumatic suspension units on all four wheels are identical with that described.

When the vehicle is traveling, the four pneumatic suspension units thereof are inflated to uniform determinate pressure, but are not in communication with the inflating means, which may be a reservoir of fluid under pressure carried by a towed vehicle, or may be a compressor carried by the vehicle. The suspension units are deflated or evacuated to lower the vehicle to firing position. For concurrently inflating or deflating the several suspension units, from either source of fluid pressure, a single control valve is provided, said valve being mounted upon the bed or frame 20 of the vehicle and designated as a whole by the numeral 110. The control valve is shown in detail in Figs. 6 to 12 inclusive to which attention now is directed.

Figure 7:
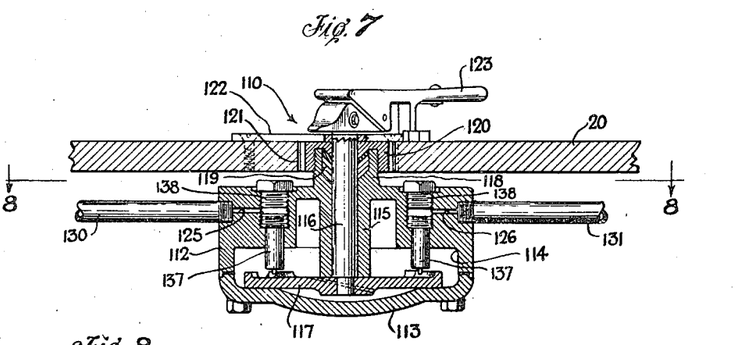
Fig. 7 is a transverse section thereof taken on line 7—7 of Fig. 6, the control handle being shown in elevation.
Figure 8:
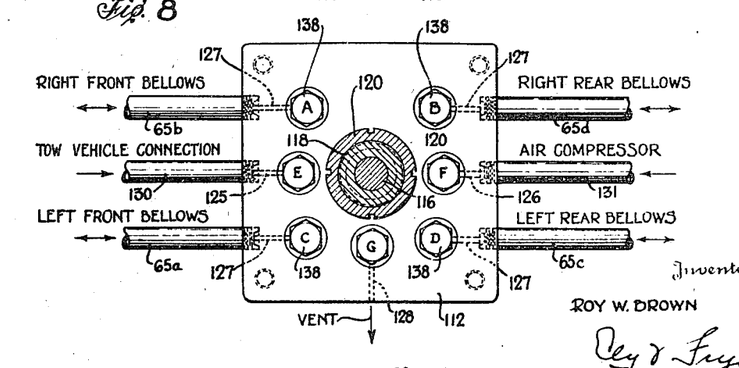
Fig. 8 is a section on the line 8—8 of Fig. 7.

As shown in Figs. 7 and 8, said valve comprises a metal housing 112 including a bottom cover 113 secured thereto in an airtight manner, there being a chamber 114 interiorly of the housing. Within said chamber the housing structure 112 is formed with a centrally positioned, axially apertured boss 115 that constitutes a bearing for a shaft 116, there being a face cam 117 secured to the lower end of said shaft. The shaft 116 extends upwardly through the housing and through an externally threaded boss 118 formed on the top thereof, said boss 118 being recessed to receive a plurality of frusto-conical packing gaskets 119. A gland nut 120 is threaded onto the boss 118 and compresses the gaskets 119 into fluid-sealing relation with the shaft 116. The gland nut 120 is positioned within an aperture 121 in the top plate of frame 20, with the housing 112 disposed below said top plate, there being an index plate 122 secured to the top of frame 20, which plate extends over said aperture 121. The plate 122 is apertured to enable the shaft 116 to extend therethrough, and an operating handle 123 is mounted upon the upper end portion of said shaft. Any suitable latch means such as that shown may be provided for latching the handle in determinate position. As shown, four latching positions are provided, which positions are 24 degrees apart from each other. The arrangement is such that turning of the handle 123 will rotate the cam 117 and cause the same to execute its intended functions, which functions are accomplished with only 72 degrees of rotation of the cam. The functions of the valve 110 are to inflate the pneumatic suspension system by means of a pump, inflate the system from a towed reservoir, shut off the system from its source of fluid supply, and evacuate the fluid from the system. Suitable indicia on the index plate indicate the positions to which the handle is turned to perform the respective functions.

Figure 12:
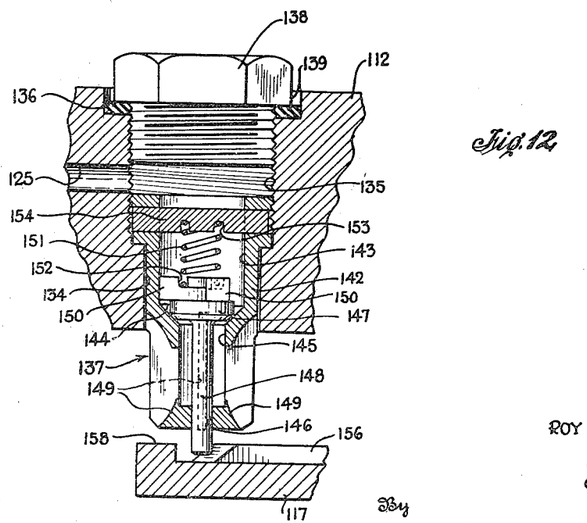
Fig. 12 is a transverse section, on a larger scale, through one of the valves incorporated in the control device.

The chamber 114 of the control valve 110 has two inlet ports through which pressure fluid is admitted to the chamber alternatively from the pump or from the reservoir on the towed vehicle. The chamber 114 also has four inlet-outlet ports through which pressure fluid is passed to or received from the respective suspension units of the vehicle, and a single outlet port for opening the chamber to the atmosphere to evacuate said units. All of the seven ports mentioned have individual valves operatively associated therewith, which valves are opened or closed by the cam 117 as presently will be explained. As shown in Fig. 8, the two inlet ports are designated 125, 126, the four inlet-outlet ports are each designated 127, and the outlet or exhaust port is designated 128. At its outer end the inlet port 125 communicates with a pipe or conduit 130 that extends to the reservoir on the tow vehicle. The outer end of the port 126 communicates with a pipe or conduit 131 extending to a pump or air compressor. The ports 127 at their outer ends communicate with respective pipes 65a, 65b, 65c and 65d that extend to the bellows of the respective suspension units of the vehicle. The individual valves aforementioned are located between the chamber 114 and the inner ends of the ports 125—128, and since said valves are identical with each other, a detail description of one will suffice. Referring especially to Fig. 12 of the drawings, it will be seen that each valve is received in a socket formed in the top wall of the housing 112, each socket comprising a bore 134 opening at its lower end into chamber 114, an internally threaded counterbore 135 at the upper end of bore 134, and a still larger counterbore 136 at the upper end of counterbore 135, and opening onto the top face of the housing. Mounted in the bore 134 and projecting into the chamber 114 is a valve that is designated as a whole by the numeral 137, said valve constituting a self-contained unit known as a "package" valve. The upper end portion of valve 137 is of enlarged diameter and is formed exteriorly with screw threads to enable it to be threaded into the bottom of counterbore 135, and to be retained in place by said threads. Threaded into the upper end of counterbore 135 is a plug 138, the head of which is received in counterbore 136. A packing gasket 139 is confined in counterbore 136 beneath the head of plug 138. A port opens into counterbore 135 between the bottom of plug 138 and the top of valve 137, which port is shown in Fig. 12 as inlet port 125.

The "package" valve 137 comprises a body or housing 142 that is formed in its upper end portion with a relatively large axial bore 143, the bottom of which is countersunk or tapered at 144, and opens into an axial bore 145 of somewhat smaller diameter therebeneath. The bore 145 extends nearly to the bottom of the housing 142, where it terminates in a yet smaller bore 146 that extends to the lower end of said housing. The tapered or countersunk region 144 constitutes a valve seat for a valve element 147, the latter being mostly of smaller diameter than the bore 143, and formed with a downwardly extending stem 148 that extends axially through bore 145 in spaced relation to the wall thereof, and is slidably received in bore 146, the lower end of the valve stem projecting from the bottom of housing 142. The lower end portion of the housing 142 is formed with a plurality of arcuate kerfs or slots 149 that are disposed in planes parallel to the axis of the valve and extend to the axial bore 145 therein, the arrangement being such as to admit pressure fluid to, or vent it from, the under side of valve element 147. Formed on the top of valve element 147 are three radially extending arms 150 that slidingly engage the wall of bore 143 to guide the valve element therein. The latter is yieldingly urged toward its seat 144 by a compression spring 151 that seats in a shallow recess 152 in the top of the valve element, and has its upper end seated in a similar recess 153 formed on the under side of a bridge-piece 154 that extends diametrically across the bore 143. The bridge-piece 154 has its end portions received in suitable apertures in opposite walls of the housing 142, and is square in section so as not to turn therein. The dimensions of the bridge-piece are such that it does not substantially impede the flow of pressure fluid through the bore 143. The arrangement is such that the valve element 147 normally is in closed position upon its seat 144, but is opened, against the force of spring 151, by upward pressure against the projecting lower end of valve stem 148.

The feature of using individual "package" valves in the control valve of the suspension system makes it possible quickly and easily to replace defective or leaky valves, and obviates the use of packing in the valves, which previously has been a source of leakage.

The seven individual valves 137 of the suspension control are designated A to G inclusive (see Fig. 8), of which valves A, B, C, and D control the passage of fluid to and from the respective bellows 54, valve E controls the fluid inlet from the towed reservoir, valve F controls the fluid inlet from the pump, and valve G controls the vent port. As will be apparent from Fig. 8, valves A, B, C, and D are disposed equi-distant from the axis of the valve shaft 116, and are 90° apart from each other. Valves E, F, and G are equi-distant from the axis of shaft 116, but the distance is somewhat less than is the case with valves A to D inclusive. Valves E and F are disposed on diametrically opposite sides of shaft 116, valve G being disposed 90° from each of them.

Figure 6:
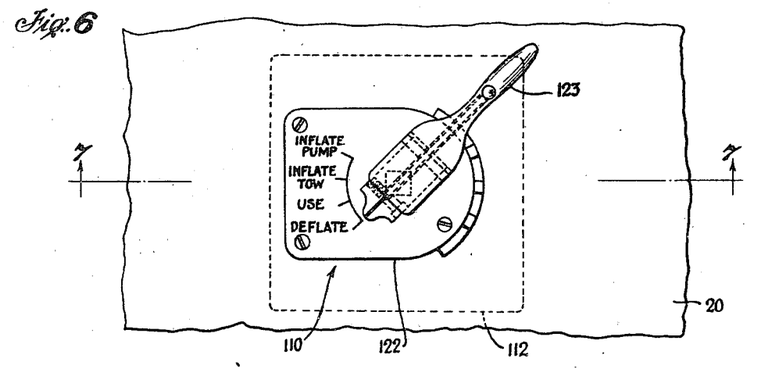
Fig. 6 is a plan view of the fluid pressure control means of the vehicle suspension.
Figure 9:
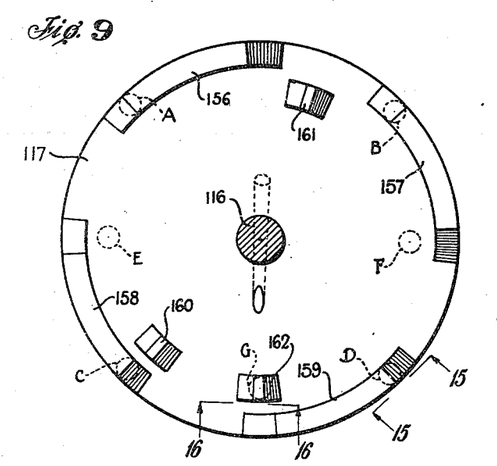
Fig. 9 is a detail plan view, on a larger scale, of a cam plate constituting an element of the control device.
Figure 10:
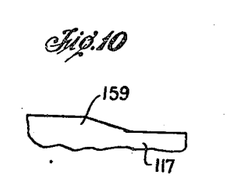
Fig. 10 is a side elevation of one of an outer series of cams of the cam plate, as viewed from the line 10—10 of Fig. 9.
Figure 11:
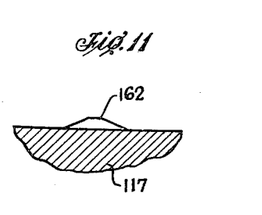
Fig. 11 is a section on the line 11—11 of Fig. 9 showing one of an inner series of cams on the cam plate.

As is best shown in Fig. 9, the top face of cam 117 is formed at its periphery with four elevated cam surfaces designated 156, 157, 158, and 159 respectively, which cam surfaces are disposed 90° apart from each other and are each about 58° in overall length. Also formed on the top face of cam 117, but spaced radially inwardly of the cam elevations aforementioned, are elevated cam surfaces 160, 161, and 162 respectively, which cam surfaces are about 16° in overall length. The cam surfaces 156 to 159 are adapted to engage the valve stems 148 of valves A to D respectively and the cam surfaces 160 to 162 are adapted to engage the valve stems of valves E, F, and G respectively. Fig. 9 shows the positions of the cam surfaces 160 to 162 with relation to each other and with relation to cam surfaces 156 to 159. This figure also shows the positions of all the cam surfaces with relation to all the individual valves when the cam 117 is in the angular position indicated by the setting of the handle 123 as shown in Fig. 6. In the latter the handle is set at "Deflate" position, and Fig. 9 shows that with the handle in this position the cams 156 to 159 are in engagement with the valve stems of valves A to D respectively, to open said valves, cam 162 is holding valve G open to open exhaust port 128, and cams 160, 161 are disengaged so that inlet valves E and F are closed. Thus the several bellows 54 are concurrently evacuated through said port 128, which condition effects the tilting of the wheels 27 to firing position. When the handle 123 is turned 24° to the position designated "Use," all cams are disengaged from all valves, and the latter are closed. This condition obtains when the wheels of the vehicle are in upright traveling position, it being understood that at such time the several suspension units are fully inflated to determinate pressure. When the handle is set at "Inflate tow" position, cams 156 to 159 are engaged with valves A to D to open the same, cam 160 is engaged with valve E to open it and admit pressure fluid to the control valve housing and thence to the suspension units, and cams 161 and 162 are disengaged so that valves F and G are closed. When the handle is set at "Inflate pump" position, cams 156 to 159 are engaged with valves A to D to open said valves, cams 160, 162 are disengaged so that valves E and G are closed, and cam 161 is engaged with valve F to open the same to admit pressure fluid to the system from the pump.

From the foregoing it will be apparent that by the simple manipulation of the handle 123 the suspension system may be charged from either of two alternative sources, the suspension units may be shut off from their source of fluid supply, or said units may be evacuated in unison. It will further be observed that when the handle is in "Use" position, as it is when the vehicle is traveling, the puncturing of any bellows or deflation of a single suspension unit for any cause will not result in deflation of any of the other suspension units since at this time the valves A to D are closed and the units are not in communication with each other.

When the suspension units are inflated, the wheels 27 are in the upright traveling position shown in Figs. 2 and 4. When the suspension units are in deflated condition the wheels 27 are in the tilted firing position shown in Fig. 3, and the bed or frame 20 of the vehicle is so much nearer the ground that but little adjustment of the screw jacks 30 is necessary. The use of the forked arms 40 for carrying the wheels makes it possible to position the pivots 48, that connect the arms to the tubular members 49, well below the axle 45 and the pivot points 42 of said arms, with the result that the suspension units may be made of greater length and capacity than otherwise would be possible. Furthermore, the suspension units have greater mechanical advantage than they would have if connected to the upper side of arms 40 since in the latter case they would be disposed more nearly parallel to the arms 40.

The vehicle is not self-propelled, but is arranged to be drawn by a suitable tractor (not shown) to which it is connected by a draught bar 165, the latter being pivotally connected to the front end of the vehicle. Steering of the vehicle is effected by a pair of steering rods 174, 174 that are operatively connected at one end to the draught bar 165 so as to be longitudinally moved thereby, and at their opposite ends are connected to respective short bracket arms 181, Fig. 1, that are mounted upon and project forwardly from respective discs or plates 182 that are secured to the respective axle spindles 45 at the front end of the vehicle.

In the event it is not convenient to inflate the several units, or any of them, from the reservoir or other source of compressed air on the towing vehicle, a hand pump is provided. This hand pump is preferably installed inside the outrigger at the right side of the chassis. It may, however, be carried at any other desired position which offers space and reasonable protection for such mechanism.

This auxiliary source of air pressure consists of any of the usual types of air pump and is operated by a lever. The unit is protected against dirt and water and is covered by a removable plate at the top of the outrigger. To bring this auxiliary pressure means into action, it is only necessary to slide the cover plate to one side, insert the operating lever in active position and connect the air line or hose to the inlet port at the valve housing. Of course, this hand pump is for use in emergencies and when power or some other quicker means of inflation is not present.

If desired, the valve connections may be so arranged that a single bellows or spring unit may be individually inflated. It is also contemplated to provide separate valve means at each unit for isolating or closing off that unit from others. In the event one of the bellows or other parts of a particular suspension unit is damaged, it may be isolated from the main valve system and thereby inflation of the remaining units is accomplished without being affected by the condition of the damaged unit.

From the foregoing description it will be apparent that the invention accomplishes the dual purpose of cushioning the vehicle while traveling, and of quickly lowering the frame of the vehicle to firing position when desired. The invention also makes possible higher speed of travel, it assures that the vehicle will follow in the path of its towing tractor, and achieves the other advantages set out in the foregoing statement of objects.

Modification may be resorted to without departing from the spirit of the invention, or the scope thereof as defined by the appended claims.

What is claimed is:

1. In a suspension for a wheeled land vehicle, the combination of a vehicle frame, an arm pivotally mounted on the frame and projecting laterally thereof, said arm having an axle on the free end thereof on which axle a wheel is mounted, a fluid pressure operated unit pivotally connected at one end to the frame and at its other end to said arm near the free end thereof adapted to oscillate said arm, said unit comprising relatively moving elements, and brake means operatively associated with said relatively movable elements for holding the same fixedly in determinate relative position, upon occasion, such as upon failure of the fluid pressure.

2. A combination as defined in claim 1 wherein the relatively moving elements comprise a pair of tubes of which one tube is telescoped within the other tube.

3. In a suspension for a wheeled land vehicle, the combination of a vehicle frame, a plurality of arms pivotally mounted thereon and projecting laterally to opposite sides thereof, each arm having an axle on the free end thereof on which axle a wheel is mounted, respective fluid pressure operated units each connected at one end to the frame and at the other end to an arm near the free end thereof for oscillating the same, each of said units comprising relatively movable elements, means for concurrently charging and discharging said fluid pressure operated units, and mechanical means operatively associated with the relatively movable elements of each unit for holding the relatively movable elements of the unit fixedly in determinate relative position, upon occasion, such as the failure of fluid pressure in the unit.

4. In a suspension for a wheeled land vehicle, the combination of a vehicle frame, an arm pivotally mounted on the frame and extending laterally therefrom, the free end of said arm carrying an axle on which a wheel is journaled, a fluid pressure operated unit pivotally connected at one end to the frame and at its other end to said arm near the free end thereof, said unit comprising a pair of telescopically arranged tubes that move axially relatively of each other in the operation of the unit, brake means carried by the innermost of said tubes and engageable with the inner surface of the outermost tube to prevent relative axial movement of the tubes, on occasion, and means accessible from the exterior of the device for manually operating said brake means.

5. A combination as defined in claim 4 wherein the brake means comprises a pair of brake shoes that extend through respective openings in opposite sides of the innermost tube.

6. A combination as defined in claim 4 wherein the brake means comprises a pair of brake shoes, and the brake operating means comprises a pair of toggles for moving the brake shoes toward and away from each other.

7. A combination as defined in claim 4 wherein the means for operating the brake means is a stem that extends axially of the innermost tube, including means for effecting axial movement of the stem relatively of said innermost tube.

ROY W. BROWN.